Sept. 15, 1931.  B. W. ST. CLAIR  1,823,707

INDICATING INSTRUMENT

Filed Jan. 4, 1930

Inventor:
Byron W. St.Clair,
by Charles E. Muller
His Attorney.

Patented Sept. 15, 1931

1,823,707

UNITED STATES PATENT OFFICE

BYRON W. ST. CLAIR, OF LYNN, MASSACHUSETTS, ASSIGNOR TO GENERAL ELECTRIC COMPANY, A CORPORATION OF NEW YORK

INDICATING INSTRUMENT

Application filed January 4, 1930. Serial No. 418,644.

My invention relates to indicating instruments and its object is to increase the visibility of the instrument pointer and scale and to reduce eye strain due to glare which is often experienced in reading instruments.

In United States Patent No. 1,672,666, June 5, 1928, Walsh, assigned to the same assignee as the present invention there is described an arrangement for accomplishing the above object in which the glass window of the instrument is slightly roughened as by sand blasting to remove the smooth outer surface and thus prevent glare. With such an arrangement it is necessary that the window be made relatively thin and the scale and pointer positioned close to its inner surface in order that they may be clearly visible through the roughened surfaced window. The roughened outer surface has a tendency to collect dust and become dirty. In many cases it is not practicable to bring the pointer and scale close enough to the inner surface of the window to obtain good visibility with the patented arrangement and it is the object of my invention to provide a non-glare window which does not require such exacting space arrangements and one less subject to the collection of dirt particles. I have discovered that a transparent window with a prismatic outer surface the angles of which are relatively flat is very effective in preventing glare and does not decrease visibility or cause image distortion to any appreciable extent. The invention will be more fully explained in connection with the accompanying drawings while the features which are considered to be new and patentable will be pointed out in the claims appended hereto.

Figure 1:
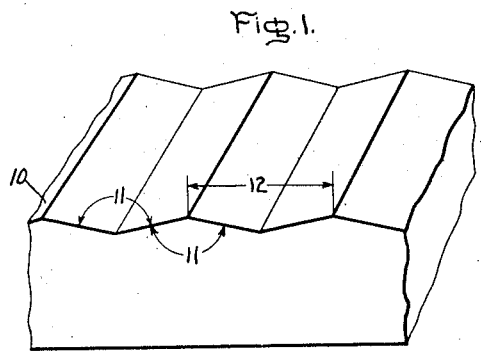
Figure 2:
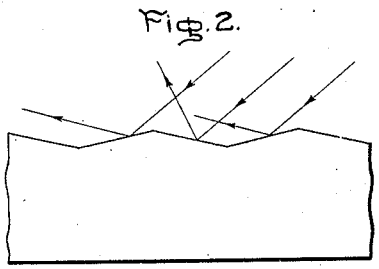
Figure 2A:
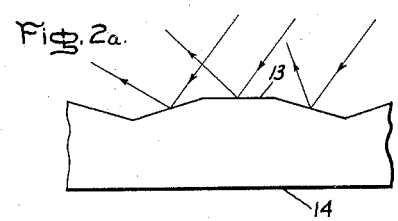
Figure 3:
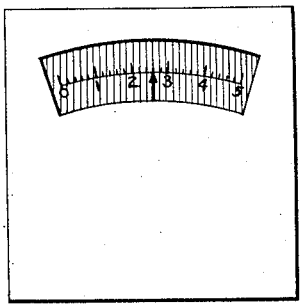
Figure 4:
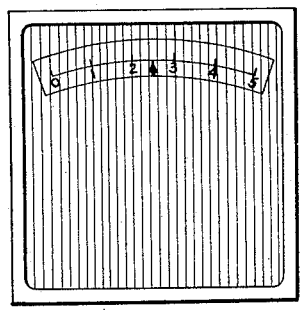
Figure 5:
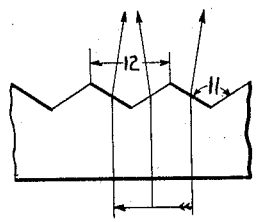
Figure 6:
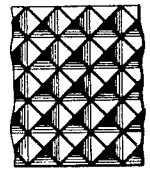

In the drawings Fig. 1 represents a section of a non-glare window as made in accordance with my invention; Fig. 2 illustrates how glaring light rays are broken up and avoided by the prismatic surface of the window of Fig. 1; Fig. 2a represents a modification of the invention and illustrates how light rays are scattered thereby. Figs. 3 and 4 show indicating instruments equipped with the non-glare window or cover of the invention; Fig. 5 illustrates exaggerated distortion effects which will be referred to in explaining the invention; and Fig. 6 represents somewhat a different form of surface for the window.

In Fig. 1, I have represented a small section of a transparent window which may be made of glass or other transparent material such as clear celluloid or bakelite. The prismatic surface 10 formed by a plurality of consecutive plane surfaces having parallel sides will be the outside of the window or the side upon which the observer stands. The thickness of the transparent sheet is immaterial and the thickness represented has no significance. This is one of the advantages of the arrangement over the prior art. The prismatic outer surface is preferably formed by molding but of course may be formed in any other suitable manner. The prismatic angles represented at 11 have been exaggerated somewhat in the drawings for the sake of the visual impression but should be very flat, for example, from 170 to 179 degrees. Thus adjoining surfaces lie at an angle to each other not exceeding about 10 degrees. This wide angle does not prevent good vision but serves very effectively in eliminating glare. The distance 12 between crests of the prisms may vary considerably but from experiments I have made it is believed the best results will be obtained if these distances lie between .007 and .03 inches. Thus the minimum distance between alternate parallel surfaces does not exceed about .015 inches in this modification.

Glare is usually caused by light rays striking the glass surface at a high angle of incidence and is generally the reflection from a light or from a window on which the sun shines. Such light rays are broken up by the prismatic surface as illustrated in Fig. 2 and glare is materially reduced. Fig. 2a represents a modification where the prismatic outer surface is formed by depressions of the general character of Fig. 1 but where such depressions are separated by an intermediate surface 13 which is parallel to the inner surface 14 of the transparent sheet. Such a surface reflects a light ray in three different directions as indicated. The angles between adjacent surfaces and the width of such surfaces will be such as to produce the results desired in accordance with the principles of the invention. The section 13 is shown as the same width of the two adjacent sections but this is not essential. As in Fig. 1 regularly recurring surfaces of the series or pattern are parallel to each other but no two adjacent surfaces are parallel. Also the surfaces are smooth and the depressions are sufficiently shallow that there is little tendency for dust to collect as it does on a surface which is roughened as by sand blasting.

The transparent covering or window is applied to the instrument, either over the scale portion as in Fig. 3, or over the entire front surface as in Fig. 4. The distance of the transparent covering from the scale or pointer is immaterial and thus the manufacturing difficulty and expense of maintaining a minimum clearance between window, scale and pointer is avoided. The lines which have been used to designate the character of the surface are of course invisible in the physical structure.

A prismatic outer surface naturally tends to distort the image somewhat. This is illustrated to an exaggerated extent in Fig. 5. However, by making the angle 11 very flat, much flatter than is illustrated, and the distance between prism crests very short, the distortion is not sufficient to be noticeable unless one resorts to accurate optical measurements. Of course the flatter the prismatic angles the less the actual distortion. Moreover, the distortion which is present averages out, so to speak, because of the small distances used between consecutive surfaces which are at an angle to each other. Thus, if a person is looking at the character 3 for example, the character having a width of .25 inches, through the prismatic surfaced glass where the distances between prism crests is .01 inches, it will be apparent that the character will be seen through about 50 of the consecutive prismatic surfaces of the window, 25 of which distort the image in one direction and 25 in another direction. However, these two sets of angularly disposed surfaces alternate with each other so that the average distortion is zero. The amount of actual distortion, however, is not sufficient to produce a blurred impression of the image. The distortion is, therefore, unnoticeable. In general if I decrease the prismatic angle 11 the distances between prisms should be narrowed and vice versa, so that there is a considerable latitude of choice between the two factors.

I do not confine myself to the particular form of surfaces illustrated in Figs. 1 and 2a; for example I may form each prism with four triangular sides (See Fig. 6 for an exaggerated illustration), instead of with two or three long parallelogram sides. The latter type of surface will in general be the least expensive to manufacture and is preferred for that reason.

In Figs. 3 and 4 the crests and depression lines of the prismatic surface are vertical and this will generally be the preferred arrangement where the troublesome light rays come from the side. However, in a station where a skylight is used over the switchboard it may be preferable to have the window of the instrument arranged with these lines in a horizontal or other than vertical direction and such arrangements are, of course, intended to be included within the scope of the invention. While the invention has been illustrated as applied to a particular type of indicating instrument, the invention is applicable to all forms of indicating instruments equipped with transparent windows such for example as clock and other dial instruments. The window may be curved or bulged.

In accordance with the provisions of the patent statutes I have described preferred embodiments of my invention. Such other embodiments as do not depart from the true spirit and scope of the invention are intended to be embraced in the claims appended hereto.

What I claim as new and desire to secure by Letters Patent of the United States, is:—

1. A transparent observation window, such window having an observation surface formed by a plurality of plane surfaces with their sides adjoining each other, adjoining surfaces lying at an angle not exceeding about 10 degrees, the width of such surfaces not exceeding about .015 inches.

2. A transparent observation window, the observation surface of which is formed by a series of plane surfaces with parallel sides adjoining each other, adjoining surfaces lying at an angle not exceeding about 10 degrees, regularly recurring surfaces of the series being parallel, the width of any one surface not exceeding about .015 inches.

3. In an indicating instrument, a transparent observation window with regularly spaced, smooth surface depressions in the outer face of such window dividing such outer face into a plurality of angularly disposed adjacent surfaces sufficiently close together to scatter reflected light rays so as to reduce glare, the angular disposition of such surfaces being insufficient to cause noticeable image distortion.

4. A window covering for indicating instruments comprising a sheet of transparent material having a plane inner surface and an outer surface formed by a series of plane surfaces with adjoining edges, adjacent surfaces lying at a small angle to each other the dimensions of said surfaces being such as to break up reflected light rays and diminish glare to an observer looking through such window covering, and the angle between adjacent surfaces being sufficiently small as to avoid noticeable image distortion.

In witness whereof, I have hereto set my hand this 31st day of December, 1929.

BYRON W. ST. CLAIR.